United States Patent [19]

Orr

[11] Patent Number: 5,157,101
[45] Date of Patent: Oct. 20, 1992

[54] PRESSURE-SENSITIVE ADHESIVE FORMULATION COMPRISING UNDERINDEXED ISOCYANATE TO ACTIVE HYDROGEN COMPOSITION

[75] Inventor: Robert B. Orr, Wilmington, Del.

[73] Assignee: Norwood Industries, Inc., Malvern, Pa.

[21] Appl. No.: 532,857

[22] Filed: Jun. 4, 1990

[51] Int. Cl.$^5$ .............................................. C08G 18/62
[52] U.S. Cl. ...................... 528/74.5; 528/75; 528/77; 528/83; 528/85; 528/81; 528/905
[58] Field of Search ............... 528/74.5, 75, 77, 83, 528/85, 81, 905

[56] References Cited

U.S. PATENT DOCUMENTS

| | | | |
|---|---|---|---|
| 3,226,354 | 12/1965 | Heiss | 260/31.2 |
| 3,246,049 | 4/1966 | Webber | 528/83 |
| 3,718,622 | 2/1973 | Camilleri et al. | 260/75 |
| 3,740,366 | 6/1973 | Sanderson et al. | 260/29.6 |
| 4,111,913 | 9/1978 | Schuhmacher et al. | 528/273 |
| 4,152,309 | 5/1979 | Ijichi | 528/75 |
| 4,420,603 | 12/1983 | Nelb, II et al. | 528/80 |
| 4,623,593 | 11/1986 | Baier et al. | 428/447 |
| 4,722,946 | 2/1988 | Hostettler | 528/83 |

*Primary Examiner*—Maurice J. Welsh
*Assistant Examiner*—Rachel Johnson
*Attorney, Agent, or Firm*—Webb, Burden, Ziesenheim & Webb

[57] ABSTRACT

A pressure-sensitive adhesive prepared from a two-package polyurethane system; the two packages comprise an isocyanate reactant and an active hydrogen reactant. The reactants are characterized by a molar insufficiency of isocyanate and at least some tri- or higher-functionality in either the active hydrogen or the isocyanate reactant, or both. The underindexing should range from 0.4 to 0.75 when the higher functionality reactant has a functionality of 2.1, and should range from 0.3 to 0.7 when the higher functionality reactant has a functionality of 4, with linearly extrapolated values in between. Pressure sensitive adhesives prepared from this system provide comparable shear resistance as do solvent-system polyurethane adhesives, without the worksite and environmental problems associated with such solvent systems.

9 Claims, No Drawings

PRESSURE-SENSITIVE ADHESIVE FORMULATION COMPRISING UNDERINDEXED ISOCYANATE TO ACTIVE HYDROGEN COMPOSITION

FIELD OF THE INVENTION

The present invention relates to polyurethane pressure-sensitive adhesives. More particularly, the present invention relates to novel pressure-sensitive adhesives, prepared from two package systems, which demonstrate shear resistance comparable to solvent-system pressure-sensitive adhesives without the worksite and environmental problems associated with such solvent systems.

BACKGROUND OF THE INVENTION

Although polymers and adhesives having good characteristics can be—and traditionally have been—prepared in both organic solvent and aqueous emulsion systems, with the advent of stricter environmental and work place protection laws and the increasing pressure for the conservation of materials and energy more desirable alternate systems pose financial and ecological advantages which are of real value. In some instances, identifying a substituting alternate system which gives acceptable results poses a technical challenge which cannot easily be overcome.

As a separate but related issue, polymers and adhesives are frequently subjected to formulational refinements designed to enhance one property or another. The desired characteristics of an adhesive or polymer are therefore often tailored by way of control of stoichiometry, and in particular by way of control of extent of crosslinking. Although polymer stoichiometry and extent of crosslinking are well understood generally, the characteristics which such stoichiometry or crosslinking will ultimately yield cannot be predicted with any certainty.

Notwithstanding the above, adhesives are known in which stoichiometry or extent of crosslinking are identified as responsible for one or more properties of the adhesive. U.S. Pat. No. 4,623,593 to Baier et al. discloses a self-adhesive polymer composition for use as a prosthetic appliance. The patent teaches that the pressure-sensitive adhesive properties of the disclosed composition result from the absence of complete crosslinking in the surface layer of the pressure-sensitive adhesive areas.

U.S. Pat. No. 3,740,366 to Sanderson et al. discloses an acrylic pressure-sensitive adhesive in which some of the carboxylic acid groups present are bound or crosslinked by a polyvalent metal. For example, a pressure-sensitive adhesive is prepared from a polymer containing free carboxylic acid groups derived from up to 4.5 percent of the total monomers of an alpha, beta ethylenically unsaturated carboxylic acid, by including in an aqueous dispersion or solution of the polymer a compatible polyvalent metal compound. Ionic crosslinking of carboxylate groups occurs upon removal of the aqueous media, at least theoretically, with no appreciable loss of tackiness in the adhesive, while the polyvalent metal/carboxylic acid bonds are believed to contribute to the improved shear resistance which such polymeric adhesives demonstrate. Sanderson et al. contemplate the use of solvent systems, although emulsion polymerization (presumably aqueous) systems are preferred.

Improved shear resistance is a common goal of adhesives design. Otherwise satisfactory adhesives, that is, adhesives which demonstrate good cohesive and adhesive strength, often demonstrate poor shear resistance. The reasons for this are not well understood, but improvement in shear resistance continues to be a goal in adhesive development. An ideal adhesive, therefore, would be manufactured from a non-solvent system, would demonstrate superior cohesive and adhesive strength, and would demonstrate shear resistance comparable to that of adhesives prepared from solvent systems or of adhesives containing expensive additives to which improved shear resistance is attributed.

SUMMARY OF THE INVENTION

In order to meet this ideal, the present invention is a pressure-sensitive adhesive prepared from a two-package polyurethane system; the two packages comprise an isocyanate reactant and an active hydrogen reactant. The stoichiometry of the system is characterized by less reactive isocyanate than reactive hydrogen (underindexing). Also there is at least some tri- or higher-functionality in either the active hydrogen or the isocyanate reactant, or both. The optimum products are obtained within the underindexing ranges from 0.4 to 0.75 when the higher functionality reactant has a functionality of 2.1, and from 0.3 to 0.7 when the higher functionality reactant has a functionality of 4, with extrapolated values in between. Pressure sensitive adhesives prepared from this system provide comparable shear resistance as do solvent-system pressure-sensitive adhesives, without the worksite and environmental problems associated with such solvent systems.

DETAILED DESCRIPTION OF THE INVENTION

Shear resistance is an important characteristic in a pressure-sensitive adhesive, because even adhesives which demonstrate good cohesion and adhesion will fail in certain applications if shear resistance is inadequate. An adhesive demonstrates good cohesion if it holds together well within the adhesive mass; an adhesive demonstrates good adhesion if the adhesive mass bonds firmly to its intended substrate. But an adhesive which demonstrates both good cohesion and good adhesion may still fail due to "creep," or inadequate shear resistance. An apt illustration of the "creep" phenomenon follows.

Certain public display walls are used for different purposes at different times. Fitting such walls with all-purpose fasteners is impractical because the use of the wall varies, and for stylistic or structural reasons hanging wires do not always provide satisfactory aesthetics or even stable positioning of the article to be displayed. In such a circumstance, a strong adhesive may be the best choice for affixing an article to a display wall. Such adhesive must demonstrate good cohesion, good adhesion and good shear resistance. The good cohesion prevents separation within the adhesive mass itself, and the good adhesion ensures that the article, the adhesive and the wall will stay in firm contact. But if the adhesive does not also demonstrate good shear resistance, the article will "walk," or "creep," down the wall over a period of time, even though no failure in cohesion or adhesion occurs. Stated more generally, shear resistance is the resistance of an adhesive to lateral forces exerted on the adhesive relative to the substrate.

There are a number of different tests used to characterize the shear resistance of adhesives. Williams plasticity as well as tests at room and elevated temperatures have been standards for various industries. In the case of the present invention, the adhesive on a strip of polyester film was adhered to a stainless steel panel supported so that the plane of the panel was 3 degrees off of vertical. With this orientation, the strip was slightly pulled onto the panel in order to avoid a force component tending to pull the strip away from the surface of the panel. A 1"×1" length of the strip was joined to the panel. The remainder of the strip was used to support a 500 gram weight. The entire assembly was placed in an oven held near 70° C. The separation of the strip from the panel was held to be failure. The movement of the strip relative to the panel was measured at the end of the test. Ideally, adhesives undergo negligible creep and therefore display good shear resistance. In this test solvent based acrylic pressure-sensitive adhesives fail unless they are specially designed, frequently with post crosslinkers.

The present invention embodies a formula for a pressure-sensitive adhesive which gives unexpectedly good shear resistance. This formula is characterized by a molar insufficiency of isocyanate (underindexing value 1.0) and at least some tri- or higher-functionality in either the active hydrogen or the isocyanate reactant, or both. The optimum products are obtained within the underindexing range of 0.4 to 0.75 when the higher functionality reactant has a functionality of 2.1, and of 0.3 to 0.7 when the higher functionality reactant has a functionality of 4, with linearly extrapolated values in between. As documented in the Examples, below, pressure-sensitive adhesives prepared from this system provided excellent shear resistance as do some specially designed solvent-system polyacrylate pressure-sensitive adhesives, without the worksite and environmental problems associated with such solvent systems.

In the context of the invention, any two package type isocyanate or active hydrogen reactants are contemplated. That is, by observing the inventive parameters summarized above, a pressure-sensitive adhesive will result which demonstrates improved shear resistance. However, selection of the isocyanate and/or active hydrogen compound should be made with the intended application of the adhesive in mind. For example, polyether resin active hydrogen compositions yield adhesives, according to the invention, which demonstrate poorer water resistance than do present pressure-sensitive adhesives prepared from polybutadiene or castor oil-based active hydrogen compositions, either of which or their combinations give superior water resistance.

The outline of the invention as provided, supra., is illustrated further by specific Examples, infra.

EXAMPLE I

The following were combined in a beaker: 3.09 grams Mondur PF, 26.91 grams R-45 HT polybutadiene resin and 0.30 grams Santowhite powder (an antioxidant from Monsanto). The isocyanate/hydroxyl ratio of the Mondur PF to the polybutadiene resin was 0.65. Mondur PF is a liquid polyisocyanate available from Mobay Chemical Corporation having a free isocyanate content of 22.6±0.6%. R-45 HT resin is a polybutadiene resin, or "poly BD," made by Atochem Inc. R-45 HT has a functionality slightly greater than 2. The admixture was cast onto a polyester film, baked at 110° C. for ten minutes, and then allowed to cure at room temperature for about 24 hours. The cast admixture yielded a cured film 2 mils in thickness. The cured film displayed no liquidity. Empirical evaluation of the film led to the conclusion that it was "tacky."

The cured adhesive was tested on the polyester on which it was cast using the shear test as described above. After four days in the oven, the adhesive continued to show good adhesion and no "creep" had occurred.

A piece of the same adhesive on polyester film was affixed to a clean stainless steel panel. The adhesive was maintained under water (70° C.) for three days. Notwithstanding the presence of excess hydroxyl in the adhesive, which excess was suspected as a cause of anticipated water sensitivity of the adhesive, adhesion was as good or better after the three day test. It is believed that the heat of this test (70° C.) contributed to enhanced adhesion, no evidence of water sensitivity was identified.

COMPARATIVE EXAMPLE I

The following were combined in a beaker: 3.71 grams Mondur PF, 26.29 grams R-45 HT and 0.30 grams Santowhite powder. The isocyanate/hydroxyl ratio of the Mondur PF to the polybutadiene resin was 0.80. The admixture was cast onto a polyester film, baked for ten minutes at 110° C., and then was permitted to cure at room temperature for about 24 hours. The cast mixture yielded a cured film 2 mils in thickness. Empirical evaluation of the film led to the conclusion that it was "not very tacky."

The adhesive was tested in accordance with the shear test as above. Before four days had elapsed the strip had fallen from the stainless steel panel. It was adjudged to have failed, as a result.

EXAMPLE II

The following were combined in a beaker: 1.78 grams PAPI (a well-known crude diphenylmethane diisocyanate), 28.22 grams R-45 HT and 0.30 grams Santowhite powder. The isocyanate/hydroxyl ratio of the Mondur PF to the polybutadiene resin was 0.50. The admixture was cast onto polyester resin, baked for ten minutes at 110° C. and then was permitted to cure at room temperature for about 24 hours, yielding a 2 mil. thick film. When tested under the same static shear test as described above, the test sample of the adhesive exhibited no "creep" over a period of four days.

EXAMPLE III

Example II was repeated two additional times, with respective changes in the stoichiometry of the reactant amounts selected so that the reactions proceeded at 0.54 and 0.46 NCO/OH underindexing. Each completed reaction yielded a pressure-sensitive adhesive for which both tack and shear resistance were satisfactory.

EXAMPLE IV

The following were combined in a beaker: 2.42 grams of 143 L, a liquid isocyanate containing product from Upjohn, 27.53 grams of R-45 HT and 0.3 grams of Santowhite powder. The isocyanate/hydroxyl ratio of the 143 L to the R-45 HT was 0.7. The admixture was cast onto a polyester sheet and baked in oven at 110° C. for 10 minutes then held for 24 hours to allow for a reaction of isocyanate which may have been unable to react as the mixture solidified in the oven treatment. This model of the invention showed no creep in the shear test over a six day period. The force required to peel the strip away from a stainless steel panel at a 180 degree angle was over 4 pounds per inch of width. After soaking in water at 70° C. for 3 days the required force to peel was over 5 pounds per inch of width.

It is expected that numerous variations in the selection of specific reactants can be made to achieve processing features and product properties suited for a variety of applications. The Examples disclosed herein thus serve to illustrate the invention but should not serve to limit it.

I claim:

1. A pressure-sensitive adhesive composition consisting essentially of the reaction product of an active hydrogen composition with an isocyanate composition, wherein at least some tri- or other higher-functionality is present in the active hydrogen composition and/or in the isocyanate composition, wherein the ratio of isocyanate to reactive hydrogen is between 0.4 and 0.75 when the reactant having some tri- or higher-functionality has a net functionality of 2.1, is between 0.3 and 0.7 when the reactant having some tri- or higher-functionality has a net functionality of 4, or a linearly extrapolated value in between, and further wherein said reaction product is a reaction product generated from a solvent-free two-package system.

2. The pressure-sensitive adhesive according to claim 1, wherein said active hydrogen composition further comprises a polybutadiene resin having active hydrogen functionality in excess of 2.

3. The pressure-sensitive adhesive according to claim 1, wherein said active hydrogen composition further comprises a castor oil derivative having active hydrogen functionality in excess of 2.

4. The pressure-sensitive adhesive according to claim 1, wherein said reaction product contains an antioxidant.

5. A method for preparing a pressure-sensitive adhesive, consisting essentially of the steps of reacting, within the bounds of a solvent-free two-package system, an active hydrogen composition with a molar insufficiency of an isocyanate composition, after selecting either said active hydrogen composition or said isocyanate composition to have a functionality between 2.1 and 4.0, so that the ratio of isocyanate to reactive hydrogen is between 0.4 and 0.75 when the reactant having some tri- or higher-functionality has a net functionality of 2.1, is between 0.3 and 0.7 when the reactant having some tri- or higher-functionality has a net functionality of 4, or a linearly extrapolated value in between.

6. The method for preparing a pressure-sensitive adhesive according to claim 5, wherein a polybutadiene resin is selected as said active hydrogen composition.

7. The method for preparing a pressure-sensitive adhesive according to claim 5, wherein a castor oil derivative is selected as said active hydrogen composition.

8. The method for preparing a pressure-sensitive adhesive according to claim 5, wherein an antioxidant is admixed with said active hydrogen composition and said isocyanate composition.

9. The product prepared according to the process of any one of claims 5-8.

* * * * *